United States Patent [19]
Leib

[11] Patent Number: 5,930,305
[45] Date of Patent: Jul. 27, 1999

[54] SIGNAL DEMODULATION AND DIVERSITY COMBINING IN A COMMUNICATIONS SYSTEM USING ORTHOGONAL MODULATION

[75] Inventor: Harry Leib, Montreal, Canada

[73] Assignee: Northern Telecom Limited, Montreal, Canada

[21] Appl. No.: 08/606,240

[22] Filed: Feb. 23, 1996

[51] Int. Cl.$^6$ .............................. H04L 27/22; H03D 3/22
[52] U.S. Cl. ....................... 375/324; 375/329; 329/304
[58] Field of Search ..................... 375/324, 347, 375/267, 200, 329; 329/372, 304, 300; 455/296, 137; 370/335, 342, 441

[56] References Cited

U.S. PATENT DOCUMENTS

| | | | |
|---|---|---|---|
| 4,850,037 | 7/1989 | Bochmann | 375/347 |
| 5,049,830 | 9/1991 | Yoshida | 375/329 |
| 5,361,276 | 11/1994 | Subramanian | 375/200 |
| 5,442,627 | 8/1995 | Viterbi et al. | 370/22 |
| 5,548,613 | 8/1996 | Kaku et al. | 375/208 |

OTHER PUBLICATIONS

"Coherent Detection With Reference–Symbol Based Channel Estimation for Direct Sequence CDMA Uplink Communications", F. Ling, Proc. 1993 IEEE Vechicular Technology Conference, Secaucus, NJ, May 1993, XP000393206, pp. 400–403.

"Implementation of a Coherent Reverse Channel 900 Mhz CDMA Receiver With Reference Symbols", T.A. Sexton et al., Proc. IEEE International Conf. on Communications, ICC'95 Seattle, Jun. 1995, XP000533151, vol. 2, pp. 1024–1028.

"The Phase of a Vector Perturbed by Gaussian Noise and Differentially Coherent Receivers" by H. Leib et al., IEEE Transactions of Information Theory, vol. 34, No. 6, Nov. 1988, pp. 1491–1501.

"Data–Aided Noncoherent Demodulation of DPSK" by H. Leib, IEEE Transactions on Communications, vol. 43, No. 2/3/4, Feb./Mar./Apr. 1995, published on or about Apr. 24, 1995, pp. 722–725.

*Primary Examiner*—Stephen Chin
*Assistant Examiner*—Betsy L. Deppe
*Attorney, Agent, or Firm*—R. John Haley

[57] ABSTRACT

For combining diversity path signals comprising symbols each modulated in accordance with one of a plurality of orthogonal (e.g. Walsh) functions, a diversity combiner includes, for each path, a demodulator to demodulate each modulated signal symbol in accordance with a selected one of the orthogonal functions, a phase estimator to estimate a phase rotation and amplitude of the diversity path signal from the demodulated signal, and a complex signal multiplier to derotate the phase and weight the amplitude of the diversity path modulated signal in dependence upon the estimated phase rotation and amplitude. The combiner sums real parts of the phase-derotated and weighted modulated signals of the diversity paths, demodulates the combined signal in accordance with all of the orthogonal functions, and selects the maximum demodulated signal for each symbol thereby to determine for the symbol the selected one of the orthogonal functions.

20 Claims, 3 Drawing Sheets

SIGNAL DEMODULATION AND DIVERSITY COMBINING IN A COMMUNICATIONS SYSTEM USING ORTHOGONAL MODULATION

This invention relates to signal demodulation and diversity combining in a communications system using orthogonal modulation.

Although the invention is applicable to such communications systems generally, it is particularly applicable to, and is described below by way of example in relation to, signal demodulation and diversity combining for the reverse channel or up-link (from a mobile station to a base station) of a direct-sequence code division multiple access (DS-CDMA) cellular communications system which is compatible with TIA/EIA (Telecommunications Industry Association/ Electronic Industries Association) Interim Standard IS-95- A, "Mobile Station-Base Station Compatibility Standard for Dual-Mode Wideband Spread Spectrum Cellular System", referred to below for convenience simply as an IS-95 system. As is known, the reverse channel of an IS-95 system uses 64-ary orthogonal modulation.

BACKGROUND OF THE INVENTION

In a DS-CDMA mobile cellular communications system, two significant channel impairments are co-channel interference from other users and fading of the signal including Doppler frequency shifts when the mobile station is moving. Modulation and coding schemes used in the system enable a desirably low error probability to be achieved for a given SIR (signal-to-interference ratio) corresponding to a certain capacity, i.e. number of users or mobile stations, of the system. It is known that coherent detection techniques are preferable to non-coherent techniques for optimizing SIR and hence providing an optimal system capacity, because coherent detection techniques enable the different diversity signals to be combined with one another in phase.

It is known to provide a communications system in which coherent detection is achieved by combining diversity signals after aligning them in phase using PLL (phase locked loop) techniques. However, PLL techniques may not function properly in fading environments, such as in cellular communications systems, due to an increased cycle skipping rate.

It is also known for example in an IS-95 system to provide a pilot signal in the forward channel or down-link (from the base station to the mobile stations) to facilitate coherent detection in the mobile station receivers. However, the use of such a common pilot signal is not feasible in the reverse channel or up-link.

An article by F. Ling entitled "Coherent Detection With Reference-Symbol Based Channel Estimation For Direct Sequence CDMA Uplink Communications", IEEE Vehicular Technical Conference, VTC '93, pages 400–403, May 1993, proposes to insert reference (pilot) symbols at a relatively high rate of 1 in every 6 symbols in the reverse channel to facilitate coherent detection. However, this technique is not compatible with an IS-95 system.

Accordingly, only non-coherent detection techniques have been presumed to be practical for the reverse channel in an IS-95 system.

An approach for non-coherent demodulation of PSK (Phase Shift Keying) modulated signals, with a performance that tends towards that of coherent demodulation, is described in an article by H. Leib et al. entitled "The Phase Of A Vector Perturbed By Gaussian Noise And Differentially Coherent Receivers", IEEE Transactions on Information Theory, Vol. 34, No. 6, pages 1491–1501, November 1988. This approach is generalized in an article by H. Leib entitled "Data-Aided Noncoherent Demodulation Of DPSK", IEEE Transactions on Communications, Vol. 43, No. 2/3/4, pages 722–725, dated February/March/April 1995 and published on or about April 24, 1995. However, these approaches do not relate to orthogonally modulated signals.

An object of this invention is to provide methods of signal demodulation and diversity combining in a communications system using orthogonal modulation, especially for the reverse channel in an IS-95 system, and to apparatus for carrying out the methods.

SUMMARY OF THE INVENTION

According to one aspect this invention provides a method of processing a modulated signal in a communications system using orthogonal modulation, comprising the steps of: demodulating the modulated signal in accordance with each of a plurality of orthogonal modulation functions to produce a plurality of demodulated signals; selecting an optimal one of the demodulated signals; estimating a phase rotation of the selected demodulated signal; and derotating the phase of the modulated signal in dependence upon the estimated phase rotation.

A related aspect of the invention provides apparatus for processing a modulated signal in a communications system using orthogonal modulation, comprising: a phase derotator responsive to the modulated signal and to a phase estimate of the modulated signal to derotate the phase of the modulated signal in dependence upon the phase estimate to produce a phase-derotated modulated signal; a demodulator arranged to demodulate the phase-derotated modulated signal in accordance with each of a plurality of orthogonal modulation functions to produce a plurality of demodulated signals; a selector arranged to select an optimal one of the demodulated signals; and a phase estimator responsive to the selected demodulated signal for producing said phase estimate.

Another aspect of the invention provides a method of combining diversity path signals comprising symbols each modulated in accordance with one of a plurality of orthogonal functions, comprising the steps of: for each diversity path modulated signal, producing a demodulated signal corresponding to the modulated signal demodulated in accordance with a selected one of the orthogonal functions, estimating a phase rotation of the modulated signal from the demodulated signal, and derotating the phase of the modulated signal in dependence upon the estimated phase rotation; combining the phase-derotated modulated signals of the diversity paths to produce a diversity-combined modulated signal; demodulating the diversity-combined modulated signal in accordance with each of the orthogonal functions to produce a plurality of diversity-combined demodulated signals; and determining a maximum one of the diversity-combined demodulated signals thereby to determine said selected one of the orthogonal functions.

This method preferably further includes the steps of, for each diversity path modulated signal, estimating an amplitude of the modulated signal and weighting the diversity path modulated signal, prior to the combining step, in dependence upon the estimated amplitude.

Advantageously the combining step comprises summing only real parts of complex signals representing the phase-derotated modulated signals.

The step of estimating a phase rotation conveniently comprises, for each diversity path modulated signal, averaging said demodulated signal for a plurality of symbols.

The invention also provides a diversity path signal combiner comprising: for each of a plurality of diversity path signals comprising symbols each modulated in accordance with one of a plurality of orthogonal functions, a demodulator arranged to demodulate each modulated signal symbol in accordance with a selected one of the orthogonal functions to produce a demodulated signal, a phase estimator arranged to estimate a phase rotation of the diversity path modulated signal from the demodulated signal, and a phase derotator arranged to derotate the phase of the diversity path modulated signal in dependence upon the estimated phase rotation to produce a phase-derotated modulated signal; a signal combiner arranged to combine the phase-derotated modulated signals of the diversity paths; a demodulator arranged to demodulate a combined signal, produced by the signal combiner, in accordance with the plurality of orthogonal functions to produce a plurality of diversity-combined demodulated signals; and a unit arranged to determine, for each symbol, an optimal one of the diversity-combined demodulated signals thereby to determine for the symbol said selected one of the orthogonal functions.

BRIEF DESCRIPTION OF THE DRAWINGS

The invention will be further understood from the following description with reference to the accompanying drawings, in which.

DETAILED DESCRIPTION

As is known, in an IS-95 system data for transmission on the reverse channel, from a mobile station to a base station, at a bit rate of 9.6 kilobits per second (kbps) is convolutionally encoded in a rate ⅓ convolutional encoder to produce code symbols at a rate of 28.8 code kilosymbols per second (ksps). After block interleaving, the code symbols at the rate of 28.8 ksps are modulated using 64-ary orthogonal modulation, one of $2^6$=64 mutually orthogonal waveforms generated using Walsh functions being produced for each group of 6 code symbols, to produce modulation symbols at a rate of 4.8 modulation ksps. Each modulation symbol is referred to as a Walsh symbol and consists of 64 Walsh chips, a Walsh chip being the shortest identifiable component of a Walsh function, and there being $2^N$ Walsh chips in a Walsh function of order N. Thus the Walsh symbols have a Walsh chip rate of 307.2 kilochips per second (kcps).

Walsh chips at the rate of 307.2 kcps are subjected to direct sequence spreading by modulo-two addition of each Walsh chip with a so-called long code to produce a chip rate of 1228.8 kcps, and the resulting chips are subjected to quadrature spreading using I and Q (in-phase and quadrature-phase) PN (pseudo-noise) sequences, and then to baseband filtering and transmission.

A receiver in the base station is required to perform the complement of these operations. In order to facilitate reception, the receiver is implemented with four diversity paths, referred to as fingers, and each finger can be supplied with an input from multiple sources, for example six sources comprising two antennas in each of three sectors of a cell. In order to maximize the capacity of the system, it is desired to combine the signals of the diversity paths or fingers in an optimal manner.

As explained in the background of the invention, coherent detection, involving combining the signals from the fingers in phase with one another, would be desirable but is not feasible. In the prior art, the signals have been combined in a non-coherent manner. More particularly, the magnitudes of the real and imaginary components of these signals have been squared and summed, phase information not being used.

Figure 1:
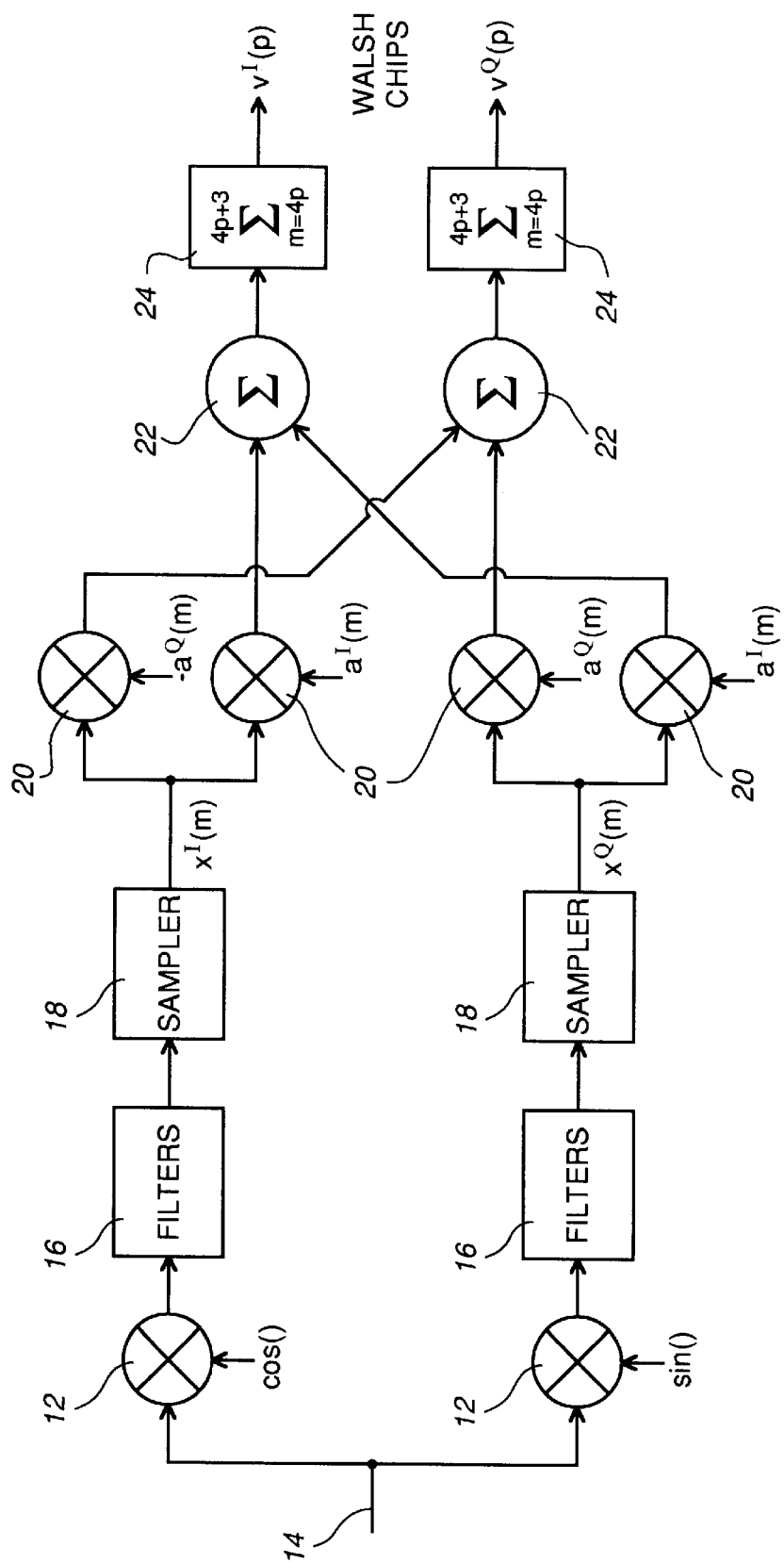
FIG. 1 schematically illustrates a block diagram of a quadrature Walsh chip demodulator for a diversity path in a reverse channel receiver of an IS-95 cellular communications system.
Figure 2:
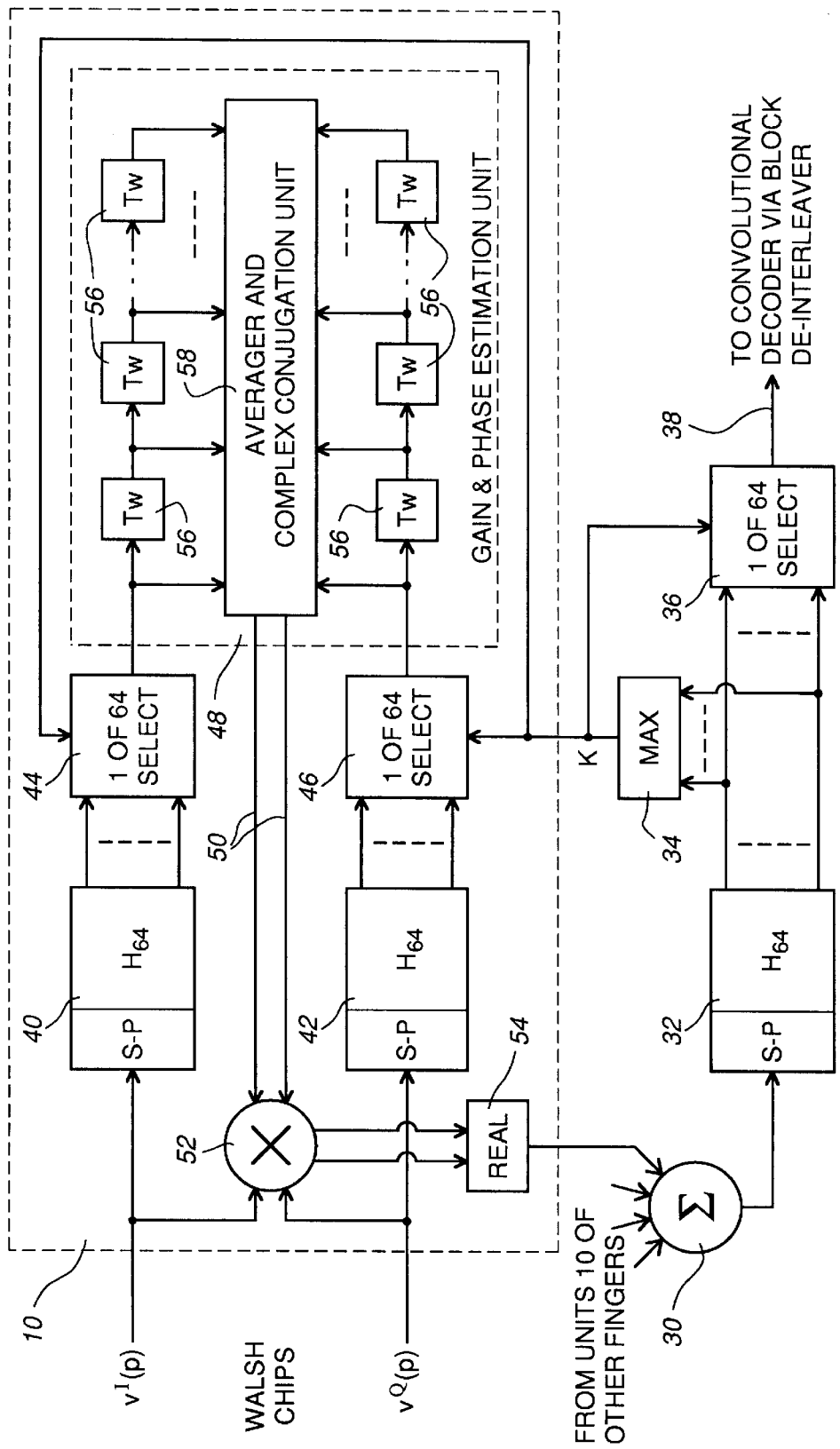
FIG. 2 schematically illustrates parts of a diversity path combiner and signal demodulator, in accordance with an embodiment of this invention, for the system.

Referring to the drawings, FIG. 1 illustrates the known concept of a quadrature Walsh chip demodulator, which serves to produce Walsh chips at its output; this illustration is included for a full understanding of the context of the invention. One such demodulator is provided for each finger. FIG. 2 illustrates a diversity path or finger combiner, which comprises a plurality of units 10, one for each finger and only one unit 10 being shown in FIG. 2 within a broken-line box, and further components which are common to the fingers and which are further described below. The output of the quadrature Walsh chip demodulator of FIG. 1 constitutes the input to a respective one of the units 10 in FIG. 2.

Referring to FIG. 1, in the quadrature Walsh chip demodulator two mixers 12 are supplied with phase quadrature (cos and sin) signals and a received signal on a line 14, and their output signals are filtered by filters 16, for example each comprising a low pass filter and a matched filter, and sampled at the chip rate of 1228.8 kcps by samplers 18 to produce phase quadrature signal samples $x^I(m)$ and $x^Q(m)$ respectively, where m is an integer index of each sample and I and Q denote in-phase and quadrature-phase components respectively. These samples are multiplied in multiplier units 20 by sequences $a^I(m)$ and $a^Q(m)$ which are constituted by the long code combined with the I and Q PN sequences respectively, and corresponding phase quadrature outputs of these units 20 are summed in summing units 22 to provide quadrature despread chips. Groups of four successive chips output from the summing units 22 are summed in further summing units 24 to produce in-phase and quadrature-phase (or real and imaginary) components $v^I(p)$ and $v^Q(p)$ respectively of Walsh chips, identified by an integer index p, at the Walsh chip rate of 307.2 kcps.

Referring now to FIG. 2, for each of four (in an IS-95 system) fingers the Walsh chips produced by a demodulator, for example as described above with reference to FIG. 1, are supplied to a respective one of four units 10, which are also all supplied with an index K which is discussed below. The outputs of the four units 10 are supplied to and summed by a summing unit 30 as shown in FIG. 2, the summing unit 30 constituting a finger or diversity path combiner. The output of the summing unit 30 is supplied to a transform unit 32, which performs an input 64-chip serial-to-parallel (S-P) conversion and a 64-ary Hadamard transform ($H_{64}$), thereby constituting a Walsh symbol demodulator for the diversity-combined signal. The transform unit 32 accordingly has 64 parallel outputs, each of which represents a demodulation of the current diversity-combined Walsh symbol in accordance with a respective one of the 64 Walsh functions. A maximum one of these outputs is determined by a maximum (MAX) unit 34, which produces at its output the index K which identifies this maximum output.

As shown in FIG. 2, in addition to being supplied to each unit 10, the index K is supplied as a control input to a 1-of-64 selection unit 36 to which the outputs of the transform unit 32 are also supplied. The selection unit 36 accordingly supplies the determined maximum output from the transform unit 32, constituting the demodulated Walsh symbol, to an output line 38. The output line 38 leads to a block de-interleaver and subsequent convolutional decoder (not shown) which in known manner perform the inverse of the block interleaving and convolutional encoding discussed above. As an alternative, the entire transformed vector from the outputs of the transform unit 32 can be supplied via the block de-interleaver to the convolutional decoder to provide an optimum combination of Walsh-Hadamard demodulation and convolutional decoding.

FIG. 2 shows in detail the unit 10 for one of the fingers; the units 10 for the other fingers are identical to this. Each unit 10 comprises two transform units 40 and 42, each of which is identical to the transform unit 32 described above and thus comprises an input serial-to-parallel (S-P) conversion and a 64-ary Hadamard transform ($H_{64}$), to which the real and imaginary components $v^I(p)$ and $v^Q(p)$ of Walsh chips at the inputs of the unit 10 are respectively supplied. The unit 10 further comprises two 1-of-64 selection units 44 and 46, each of which is controlled by the index K supplied to the unit 10 from the maximum unit 34 to select a respective one of the 64 outputs of the units 40 and 42, respectively. The outputs of the selection units 44 and 46 together constitute real and imaginary components of a complex signal demodulated Walsh symbol which is supplied to a gain and phase estimation unit 48 shown within a broken-line box and described further below. The estimation unit 48 produces at its output on lines 50 real and imaginary components of a complex signal which is the complex conjugate of an estimate of the complex signal supplied to the estimation unit from the selection units 44 and 46. In other words, if an estimate of the complex signal supplied by the selection units 44 and 46 is represented by $Ae^{j\theta}$, where A denotes an estimated amplitude and $\theta$ represents an estimated phase, then the output of the estimation unit on the lines 50 is represented by $Ae^{-j\theta}$.

The unit 10 further comprises a complex signal multiplier 52, which is arranged to multiply the incoming Walsh chip complex signal by the complex signal on the lines 50, and a real function unit (REAL) 54 to which the product of the complex signal multiplier 52 is supplied. The unit 54 supplies the real component of this complex signal product to the summing unit 30 as the contribution from the respective finger, the summing unit 30 combining the contributions from the four fingers as already described above.

In the form of the estimation unit 48 illustrated in FIG. 2, this unit is constituted by a plurality of delay elements 56, each providing a delay Tw equal to the Walsh symbol time of $1/4.8$ ksps=208.3 $\mu$s. The delay elements 56 form tapped delay lines for the outputs of each of the selection units 44 and 46, the taps providing inputs to an averager and complex conjugation unit 58. The unit 58 forms an average of the complex signals represented by the real and imaginary signal components at the delay line taps, constituting the complex signal $Ae^{j\theta}$ referred to above, and produces the complex conjugate $Ae^{-j\theta}$ of this average in the form of real and imaginary signal components on the lines 50.

In other words, if the outputs of the selection units 44 and 46 are real and imaginary signal components $z^I(n-1)$ and $z^Q(n-1)$ respectively, where n is an integer index of a current Walsh symbol comprising Walsh chips currently incoming to the unit 10, they together represent the complex signal $z^I(n-1)+jz^Q(n-1)$. If each delay line has an integer number L of delay elements 56, then the complex signal $Ae^{j\theta}$ is defined by the equation:

$$Ae^{j\theta} = \left(\frac{1}{L+1}\right)\sum_{r=1}^{L+1}(z^I(n-r)+jz^Q(n-r))$$

and the signal components on the lines 50 are the real and imaginary parts of its complex conjugate $Ae^{-j\theta}$. By way of example, L can conveniently be in the range from about 10 to 12, or can be a convenient power of two such as 8 or 16.

In operation, the transform units 40 and 42 and the selection units 44 and 46 perform, in accordance with the recursively determined index K, a demodulation of each incoming complex signal Walsh symbol to provide a demodulated complex signal to the gain and phase estimation unit 48. The unit 48 provides the complex output signal $Ae^{-j\theta}$ on the lines 50 which has an amplitude A which is an estimate or average of the amplitude of the previous L+1 demodulated Walsh symbols, and hence represents a received signal amplitude for the respective finger, and has a phase $-\theta$ which is the inverse of a carrier phase shift, or phase rotation, $\theta$ of the incoming Walsh chips from the real axis in a phase plane representation of the complex signal Walsh chips. The averaging serves in part to reduce the effects of noise, and the value of L is selected accordingly.

In the multiplication unit 52, each incoming complex signal Walsh chip is multiplied by the complex signal $Ae^{-j\theta}$ on the lines 50. This multiplication provides a phase derotation of each Walsh chip by the inverse $-\theta$ of its phase rotation $\theta$ from the real axis, whereby each Walsh chip is aligned in phase with the real axis. At the same time, this multiplication provides a weighting of the amplitude of each Walsh chip in accordance with the average signal amplitude for the finger. Because the same processes take place in the units 10 for all of the fingers, the resulting complex signals at the outputs of the multiplication units 52 in the different units 10 are all substantially aligned in phase and amplitude-weighted in accordance with the average signal amplitudes of the respective fingers. They can therefore be combined by summing them to produce a result which is, to a substantial extent, equivalent to a coherent combination of the Walsh chips from the different fingers.

Because the output of the multiplication unit 52 is a complex signal including noise and interference components as well as the desired signal which is substantially aligned with the real axis, the real function unit 54 is provided to pass to the output of the unit 10 only the real part of this complex signal, whereby a signal to noise ratio enhancement is provided by suppression of the imaginary component of the complex signal comprising mostly noise and interference. The output of the real function unit 54 then constitutes the output of the unit 10, and is a real signal which is supplied as described above to the summing unit 30, where it is combined with the other weighted Walsh chip signals from the other fingers by a simple summation of these real signals.

Because of the phase alignment and amplitude weighting of the signals in the multiplication units 52, the output of the summing unit 30 constitutes an optimized diversity-combined sequence of Walsh chips phase-aligned with the real axis. As already described above, the Walsh symbols constituted by this sequence are demodulated by the transform unit 32 in accordance with all of the Walsh functions, and the maximum determined by the unit 34 to determine the index K.

An advantage of this arrangement is that it provides particularly good gain for situations in which the transmitting mobile station is stopped or is moving slowly, when the convolutional coding gain is relatively low. Conversely, for rapid movement of the mobile station, when the convolutional coding gain is higher, the gain of this arrangement is less due to less accurate amplitude and phase estimation. This arrangement and convolutional coding thus together provide a complementary and particularly beneficial combination.

The functions of the diversity combining arrangement of FIG. 2 can all be conveniently implemented, possibly together with other functions of the communications system, in one or more digital signal processor integrated circuits.

It can be appreciated that different forms of gain and phase estimation from that described above in relation to the unit 48 can be used. For example, instead of simple averaging as described above, it can be appreciated that the arrangement could instead use recursive averaging, Kalman filtering, or any other convenient averaging or filtering process to provide desired amplitude and phase estimates. Furthermore, although the unit 48 as described above provides these estimates of amplitude and phase in a single process, these estimates could instead be provided separately. For example, the amplitude could be estimated by summing the squared amplitudes of the demodulated signals at the outputs of the units 44 and 46 or at the outputs of the units 40 and 42, and the phase could be separately estimated from this estimated amplitude and the amplitude at the output of the unit 46.

In addition, although as described above the Walsh chips of each finger are weighted directly in dependence upon the estimated amplitude by being multiplied by this in the multiplication unit 52, any other desired form of weighting, for example dependent on a non-linear function such as the square of the estimated amplitude, or even no weighting at all (although this is not preferred), may be used instead. Furthermore, the functions of phase derotation and weighting, combined in the multiplication unit 52 as described above, can if desired be performed separately from one another. It can also be appreciated that the real function unit 54 can be omitted, and the complex signal Walsh chips can be combined and demodulated, instead of using only the real parts of these signals as described above, although again this is not preferred because of the noise cancellation benefits and relative simplicity of the arrangement as described above.

It can also be appreciated that, although as described above the Walsh chips of each Walsh symbol are demodulated in accordance with all of the orthogonal Walsh functions by the transform units 40 and 42 in synchronism with the demodulation of the diversity-combined Walsh symbol by the transform unit 32, with subsequent selection by the selection units 44 and 46 in accordance with the index K determined for the respective symbol, this need not be the case. Instead, for example, a delay Tw by one Walsh symbol time can be provided between the incoming Walsh chips and the transform units 40 and 42, these units being responsive to the index K (the separate selection units 44 and 46 being dispensed with) to demodulate the Walsh symbol in accordance with only the selected Walsh function determined by the index K. This alternative reduces the computation required for each unit 10 but introduces a delay Tw in the estimation of gain and phase; however this delay may not be significant if the gain and phase change relatively slowly.

In addition, although the above description relates specifically to an IS-95 system, it can be appreciated that the invention can also be applied to other communications systems using orthogonal modulation in which diversity path signals are combined, each diversity path signal being phase-aligned by performing a phase derotation dependent upon a phase estimate of the incoming signal, and desirably but optionally also being weighted in dependence upon an amplitude estimate of the incoming signal.

It can be appreciated that the invention can also be applied to communications systems in which there is not necessarily any diversity combining, but simply a desire to phase-align an incoming orthogonally modulated signal prior to demodulation, for example to achieve a noise reduction by use of the real function unit 54 as described above. With only one signal the arrangement would require only one unit 10, and the weighting described above and the summing unit 30 would be dispensed with. The arrangement can then be simplified if desired by making it recursive, with the units 32 and 36 dispensed with, the maximum unit 34 instead having its inputs supplied from the outputs of the unit 40, and the units 40 and 42 being supplied with the outputs of the phase derotation unit (multiplication unit 52) instead of the incoming signal. Such an arrangement is illustrated in a general block diagram form in FIG. 3.

Figure 3:
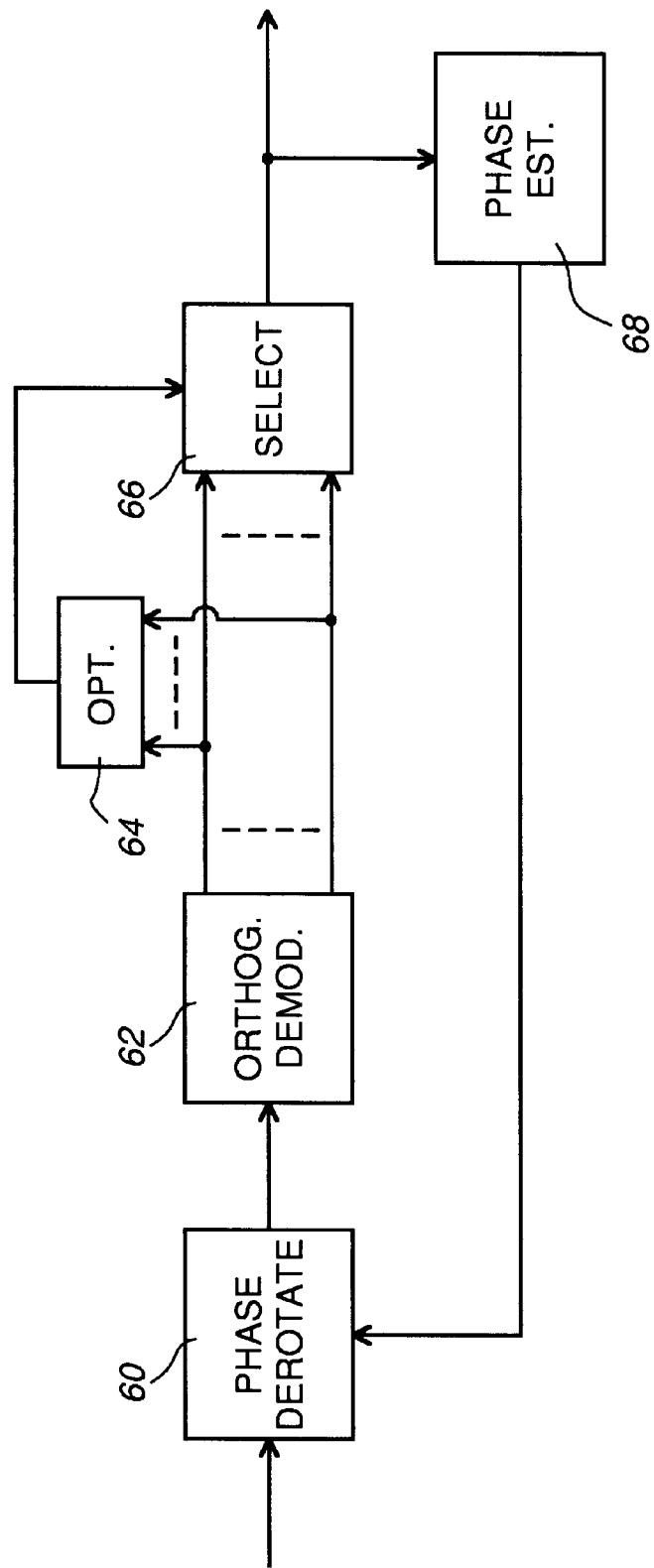
FIG. 3 illustrates a general block diagram of a signal demodulator in accordance with an embodiment of this invention.

Referring to FIG. 3, in which for simplicity single lines are shown for carrying possibly complex signals, incoming orthogonal modulation symbols are supplied via a phase derotator 60 to a demodulator 62, which demodulates each symbol in accordance with each of the orthogonal modulation functions to produce a plurality of demodulated outputs, an optimal (e.g. maximum) one of which is determined by a unit 64 which controls a selector 66 to select this optimal demodulated signal as an output. A phase rotation of this output signal is determined by a phase estimator 68, the output of which is used to control the phase derotator 60 to produce a converse phase derotation.

Thus although particular embodiments of the invention have been described in detail, it should be appreciated that these and numerous other modifications, variations, and adaptations may be made without departing from the scope of the invention as defined in the claims.

What is claimed is:

1. A method of processing a modulated signal in a communications system using orthogonal modulation, comprising the steps of:

demodulating the modulated signal in accordance with each of a plurality of orthogonal modulation functions to produce a plurality of demodulated signals;

selecting an optimal one of the demodulated signals;

estimating a phase rotation of the selected demodulated signal; and derotating the phase of the modulated signal in dependence upon the estimated phase rotation.

2. A method as claimed in claim 1 wherein the step of derotating the phase of the modulated signal is performed on the modulated signal prior to the step of demodulating the modulated signal.

3. A method as claimed in claim 2 wherein the modulated signal comprises Walsh symbols and the step of demodulating comprises performing a Hadamard transform.

4. A method as claimed in claim 1 wherein the modulated signal comprises Walsh symbols and the step of demodulating comprises performing a Hadamard transform.

5. A method of combining diversity path signals comprising symbols each modulated in accordance with one of a plurality of orthogonal functions, comprising the steps of:

for each diversity path modulated signal, producing a demodulated signal corresponding to the modulated signal demodulated in accordance with a selected one of the orthogonal functions, estimating a phase rotation of the modulated signal from the demodulated signal, and derotating the phase of the modulated signal in dependence upon the estimated phase rotation;

combining the phase-derotated modulated signals of the diversity paths to produce a diversity-combined modulated signal;

demodulating the diversity-combined modulated signal in accordance with each of the orthogonal functions to produce a plurality of diversity-combined demodulated signals; and determining a maximum one of the diversity-combined demodulated signals thereby to determine said selected one of the orthogonal functions.

6. A method as claimed in claim 5 and further including the steps of, for each diversity path modulated signal, estimating an amplitude of the modulated signal and weighting the diversity path modulated signal, prior to the combining step, in dependence upon the estimated amplitude.

7. A method as claimed in claim 6 wherein, for each diversity path modulated signal, the steps of derotating the phase and weighting the amplitude of the modulated signal comprise multiplying the modulated signal by a complex conjugate of an estimate of the demodulated signal.

8. A method as claimed in claim 7 wherein the combining step comprises summing only real parts of complex signals representing the phase-derotated modulated signals.

9. A method as claimed in claim 6 wherein the combining step comprises summing only real parts of complex signals representing the phase-derotated modulated signals.

10. A method as claimed in claim 5 wherein the combining step comprises summing only real parts of complex signals representing the phase-derotated modulated signals.

11. A method as claimed in claim 5 wherein, for each diversity path modulated signal, the step of producing a demodulated signal comprises the steps of demodulating the modulated signal in accordance with each of the orthogonal functions to produce a plurality of demodulated signals, and selecting one of said plurality of demodulated signals as said demodulated signal.

12. A method as claimed in claim 5 wherein, for each diversity path modulated signal, the step of estimating a phase rotation comprises averaging said demodulated signal for a plurality of symbols.

13. A method as claimed in claim 5 wherein the modulated signals comprise Walsh symbols and the step of demodulating comprises performing a Hadamard transform.

14. Apparatus for processing a modulated signal in a communications system using orthogonal modulation, comprising:

a phase derotator responsive to the modulated signal and to a phase estimate of the modulated signal to derotate the phase of the modulated signal in dependence upon the phase estimate to produce a phase-derotated modulated signal;

a demodulator arranged to demodulate the phase-derotated modulated signal in accordance with each of a plurality of orthogonal modulation functions to produce a plurality of demodulated signals;

a selector arranged to select an optimal one of the demodulated signals; and a phase estimator responsive to the selected demodulated signal for producing said phase estimate.

15. Apparatus as claimed in claim 14 wherein the phase derotator comprises a complex signal multiplier.

16. Apparatus as claimed in claim 14 wherein the phase estimator comprises an averager.

17. A diversity path signal combiner comprising:

for each of a plurality of diversity path signals comprising symbols each modulated in accordance with one of a plurality of orthogonal functions, a demodulator arranged to demodulate each modulated signal symbol in accordance with a selected one of the orthogonal functions to produce a demodulated signal, a phase estimator arranged to estimate a phase rotation of the diversity path modulated signal from the demodulated signal, and a phase derotator arranged to derotate the phase of the diversity path modulated signal in dependence upon the estimated phase rotation to produce a phase-derotated modulated signal;

a signal combiner arranged to combine the phase-derotated modulated signals of the diversity paths;

a demodulator arranged to demodulate a combined signal, produced by the signal combiner, in accordance with the plurality of orthogonal functions to produce a plurality of diversity-combined demodulated signals; and a unit arranged to determine, for each symbol, an optimal one of the diversity-combined demodulated signals thereby to determine for the symbol said selected one of the orthogonal functions.

18. A diversity path signal combiner as claimed in claim 17 and including, for each of the diversity path signals, a weighting unit arranged to weight the phase-derotated modulated signal in dependence upon an estimate of an amplitude of the respective diversity path signal.

19. A diversity path signal combiner as claimed in claim 18 wherein, for each of the diversity path signals, the phase derotator and the weighting unit are constituted by a complex signal multiplier.

20. A diversity path signal combiner as claimed in claim 17 wherein the signal combiner comprises a summing unit arranged to sum only real parts of complex signals representing the phase-derotated modulated signals.

* * * * *